3,337,498
LINEAR POLYESTERS OF 1,4-BICYCLO[2.2.2]OCTANEDIMETHANOL
Milton Jones Hogsed, Kinston, and William Harrison Watson, Grifton, N.C., assignors to E. I. du Pont de Nemours & Company, Wilmington, Del., a corporation of Delaware
No Drawing. Filed Nov. 7, 1962, Ser. No. 236,158
12 Claims. (Cl. 260—47)

This invention relates to a novel alicyclic glycol and esters thereof. The invention also comprehends novel linear polyesters prepared from the glycol, as well as fibers, films, and other shaped articles produced therefrom.

In accordance with this invention, it has been found that 1,4-bicyclo[2·2·2]octanedimethanol and esters thereof represented by the structural formula,

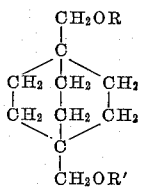

wherein R and R' represent hydrogen or an acyl radical, can be readily prepared and have excellent utility in the preparation of linear polyesters. The monomer esters of the glycol prepared by reacting dibasic carbonyloxy acids, or ester-forming derivatives thereof, with the 1,4-bicyclo[2·2·2]octanedimethanol, or ester-forming derivatives thereof, are readily polymerized to form polyester products useful in the preparation of molding compositions; and the higher melting products are especially advantageous for the preparation of fibers and films. The polyesters have good heat stability, apparently resulting partly from the absence of hydrogen atoms on the bridgehead carbon atoms, thus precluding simple chain-breaking degradation reactions involving α, β-elimination between the carbon atom carrying the esterified hydroxyl group and the bridgehead carbon atom to form a terminal methylene group; although this and other statements herein concerning the effect of polymer structure on properties are not intended as limiting.

The presence of the 1,4-bicyclo[2·2·2]octanedimethanol residue in the repeating structural units of the polyester appears to be particularly beneficial for end use of the polymer to form fibers for use in garments which are relatively free from wrinkling after laundering, so that little or no ironing of the garments is required. Fabrics adaptable for making garments of this type, requiring only minimum care, are frequently characterized as "wash-and-wear" fabrics. The size and stiffness of the 1,4-bicyclo[2·2·2]octanedimethylene radical, together with the considerable angular displacement of the main polymer chain caused by the angles at which the chain-extending bonds of the radical are held, apparently confers a balance of polymer chain stiffness and polymer chain resilience which results in the observed good recovery of fibers of the polymer from tensile stress.

A preferred starting material for synthesis of the novel glycol is an alkyl ester of 1,4-bicyclo[2·2·2]octanedicarboxylic acid, the preparation of which is described by Roberts, Moreland, and Frazer in J. Am. Chem. Soc., 75, 637 (1953). Reduction of the carboxylic ester groups by reaction with lithium aluminum hydride leads directly to 1,4-bicyclo[2·2·2]octanedimethanol. The novel glycol can also be prepared by other methods, such as by hydrogenation of 1,4-bicyclo[2·2·2]octanedicarboxylic acid or its esters with a catalyst such as copper chromite.

The novel linear polyesters of the invention are characterized by possessing recurring units of the following formula:

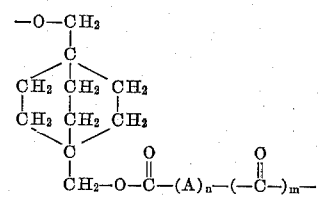

wherein $m$ is 0 or 1, $n$ is 0 when $m$ is 0, $n$ is 0 or 1 when $m$ is 1, and A is a divalent organic radical corresponding to the radical A in the starting material dicarboxylic acid, $A(COOH)_2$. Preferably, A is a hydrocarbon group of 6 to 24 carbon atoms including at least one 6-membered carbocyclic nucleus, the carboxyl substituents being separated by a chain of at least three nuclear carbon atoms, and the group being free from aliphatic unsaturation. Thus, A may be an arylene, aralkylene, or cycloalkylene radical of 6 to 24 carbon atoms derived from the dicarboxylic acid of the formula $A(COOH)_2$, the carboxyl groups being attached in positions other than ortho positions on the ring. Obviously, A may be a corresponding oxyhydrocarbon radical free from hetero atoms other than ether oxygen, since this is hydrocarbon in character.

The dibasic carbonyloxy acid starting material for preparing esters of the glycol may be in the form of ester-forming derivatives, i.e., the carbonyl halides, anhydrides, salts, or esters, particularly dibasic carbonyloxy acids esterified with lower aliphatic alcohols or with phenol.

Suitable dicarboxylic acids include oxalic acid, succinic acid, adipic acid, sebacic acid, terephthalic acid, methylterephthalic acid, 2,5- or 2,6-dimethylterephthalic acid, chloroterephthalic acid, 2,5-dichloroterephthalic acid, fluoroterephthalic acid, isophthalic acid, the naphthalenedicarboxylic acids and especially the 1,4-, 1,5-, 2,6- and 2,7-isomers, phenylenediacetic acid, 4-carboxyphenoxyacetic acid, m- and p-terphenyl-4,4''-dicarboxylic acid, dodecahydrobibenzoic acid, hexahydroterephthalic acid, 4,4'-bibenzoic acid, 2,2'- and 3,3'-dimethyl-4,4'-bibenzoic acid, 2,2'-dibromo-4,4'-bibenzoic acid, bis(4-carboxyphenyl)methane, 1,1- and 1,2 - bis(4 - carboxyphenyl)ethane, 2,2 - bis(4-carboxyphenyl)propane, 1,2-bis(4-carboxyphenoxy)ethane, bis-4-carboxyphenyl ether, bis-4-carboxyphenyl sulfide, bis-4-carboxyphenyl ketone, bis - 4 - carboxyphenyl sulfoxide, bis-4-carboxyphenyl sulfone, 2,8-dibenzofurandicarboxylic acid, 4,4'-stilbenedicarboxylic acid, and octadecahydro-m-terphenyl-4,4''-dicarboxylic acid.

The divalent A radical is preferably composed primarily of carbon and hydrogen but may contain, in addition to the two carboxyl groups to which it is attached, other non-hydrocarbon components which are inert in the polyesterification reaction. For example, halogen substituents may be present, or the radical A may be a chalkogen-containing radical wherein each chalkogen atom is bonded to carbon or a different chalkogen atom. Thus, the repeating units may contain ether, carbonyl, sulfide, sulfoxide, or sulfonyl radicals. Mixtures of dicarboxylic acids may be employed. Polyesters of the glycol with carbonic acid may also be prepared by employing an appropriate derivative of the acid, e.g., diphenyl carbonate.

The polyesters of the invention are prepared by reacting a dibasic carbonyloxy acid or an ester-forming derivative thereof, as described above, with 1,4-bicyclo[2·2·2]octanedimethanol or an ester-forming derivative of the glycol to form an ester monomer from which the polyester product is formed by conventional condensation polymerization procedures. By an ester-forming derivative of the glycol is meant a derivative of 1,4-bicyclo[2·2·2] octanedimethanol containing functional groups equivalent to the hydroxyl group in their ability to react with hydroxycarbonyl groups, such as esters of the glycol with acetic acid or other lower aliphatic acids.

A convenient method is to prepare the ester by reacting an alkyl ester of a dibasic carbonyloxy acid with 1,4-bicyclo[2·2·2]octanedimethanol in an ester interchange reaction, followed by polycondensation at high temperature and at a low partial pressure of the glycol, until a polymer of the desired molecular weight is produced. In carrying out the ester interchange reaction, at least one molecular proportion of 1,4-bicyclo[2·2·2]octanedimethanol per molecular proportion of the dibasic carbonyloxy ester should be used, preferably about 1.5 to 2.1 mols of the glycol per mol of the ester. It is desirable to employ an ester of the dibasic carbonyloxy acid formed from an alcohol or phenol with a boiling point considerably below that of 1,4-bicyclo[2·2·2]octanedimethanol so that the former can be removed easily from the reaction zone by distillation. It is preferred to use the methyl or ethyl esters, as these esters are formed from alcohols which, because of their relatively low boiling points, are easily separated by distillation from the glycol. Heating should be above the melting point of the reaction mixture and above the boiling point of the alcohol or phenol to be displaced. Heating should be effected under conditions such that the displaced alcohol or phenol can be removed from the reaction zone, usually by means of conventional distillation equipment. The heating is usually at atmospheric pressure, but higher or lower pressures may be used if desired. The ester interchange reaction is advantageously carried out in the presence of ester interchange catalysts such as manganous acetate, calcium acetate, litharge, sodium methoxide, sodium hydrogen hexabutoxytitanate, tetra-alkyl titanates such as tetraisopropyl titanate, or other suitable ester interchange catalysts as described in the literature relating to preparation of polyesters.

Following the ester interchange reaction, heating is continued under reduced pressure until the excess glycol is removed and the polymerization reaction has proceeded to the desired degree. The final stages of polymerization may be carried out with polymer in the molten state or, if desired, the reaction may be completed by solid phase polymerization. The polymerization reaction may be carried out in the presence of catalysts such as antimony trioxide, litharge, zinc acetate, or other suitable polycondensation catalysts as described in the literature. Sodium hydrogen hexabutoxytitanate and the tetra-alkyl titanates such as tetraisopropyl titanate are examples of catalysts which may be used for both the ester interchange and polymerization steps.

As used herein the term "polyester" is intended to include not only homopolyesters but also copolyesters, terpolyesters, and the like.

While a preferred embodiment of the invention comprises polyesters in which all, or substantially all (i.e., greater than 90%), of the recurring structural units consist of 1,4-bicyclo[2·2·2]octanedimethanol esters of dibasic carbonyloxy acids, it is to be understood that the invention also comprises polyesters in which residues of other hydroxy compounds are present. In general, it is preferred that at least about 50 mol percent of the hydroxy component of the polyester is 1,4-bicyclo[2·2·2] octanedimethanol, although of course smaller proportions can be employed. By "hydroxy component" of the polyester is meant the sum of all the hydroxy-substituted compounds which would be formed by hydrolysis of the carbonyloxy linkages in the polymer chain. The remainder of the hydroxy component of the polyester, up to about 50 mol percent, may be any suitable dihydroxy compound or hydroxycarboxylic acid. Examples of such compounds include ethylene glycol, propylene glycol, butylene glycol, 2,2-dimethylpropylene glycol, 2-methyl-2-ethylpropylene glycol, 2-methyl-2-propylpropylene glycol, 2,2,3,3,4,4-hexafluoro-1,5-pentanediol, hexamethylene glycol, decamethylene glycol, diethylene glycol, ethylene thiodiglycol, cis- or trans-hexahydro-p-xylylene glycol, cis- or trans-quinitol, bis(4-hydroxymethylcyclohexyl), bis-(4-hydroxymethylcyclohexyl)ethane, decahydro-1,4-, -1,5-, -2,6-, or -2,7-bis(hydroxymethyl)naphthalene, 1,1-bis-(hydroxymethyl)cyclohexane, 1,4-bis(2-hydroxyethyl)-benzene, 1,4-bis(2-hydroxyethoxy)benzene, 4 - (2 - hydroxyethyl)benzoic acid, and 4 - (2 - hydroxyethoxy)benzoic acid.

The remainder of the hydroxy component may also be a dihydric phenol. A convenient method of preparing such copolyesters involves (A) preparation of a homopolyester of 1,4-bicyclo[2·2·2]octanedimethanol and a dibasic carbonyloxy acid as described above, (B) preparation of a homopolyester of the dihydric phenol with the dibasic carbonyloxy acid, e.g., by reacting the dihydric phenol with the diphenyl ester of the acid in the presence of sodium acetate as a catalyst, and (C) melt blending the glycol polyester and the dihydric phenol polyester in the desired proportions under an atmosphere of nitrogen. The blended mixture initially forms a block copolyester, but if the mixture is held an hour or so in the melt the copolyester becomes random. The catalysts present in the homopolyester also serve as catalysts for the randomization of the copolyester. Suitable dihydric phenols for the preparation of such copolyesters include hydroquinone, resorcinol, 4,4'-dihydroxybiphenyl, 3,3'-dibromo-4,4'-dihydroxybiphenyl, bis(4-hydroxyphenyl)methane, 2,2-bis (4 - hydroxyphenyl)propane, 2,2 - bis(3,5 - dichloro-4-hydroxyphenyl)propane, bis(4-hydroxyphenyl)ether, bis(4-hydroxyphenyl)sulfone, bis(4-hydroxyphenyl)ketone, and bis(4-hydroxyphenyl)sulfoxide.

Hydrocarbons substituted with two hydroxy groups, or substituted with one hydroxy group and one carboxylic acid group, are normally preferred as copolymeric hydroxy components; however, halogen or chalkogen substituents or radicals may also be present, as described above with respect to the dicarboxylic acid. A minor amount of a dicarboxylic acid or a hydroxy component carrying a metallic sulfonate salt, carboxylate salt, phosphonate salt, or the like may also be present.

The invention therefore comprehends solid polymeric linear carbonyloxy polyesters of bifunctional compounds containing two functional groups selected from the class consisting of (a) hydroxy groups and (b) hydroxycarbonyl groups, said bifunctional compounds consisting of (A) a hydroxy component containing at least about 50 mol percent 1,4-bicyclo[2·2·2]octanedimethanol and (B) a dibasic carbonyloxy acid. Preferably, a dicarboxylic acid is employed containing from 8 to 26 carbon atoms, including at least one 6-membered carbocyclic nucleus, the carboxyl groups being separated by a chain of at least 3 nuclear carbon atoms.

Within the broad range of useful polymers, including lower melting polyesters suitable for molding compositions, it is generally considered that those polyesters melting above about 200° C. and as high as about 325° C. are especially advantageous for extrusion in unmodified form to produce fibers and films. Higher melting polyesters are especially adapted for high temperature applications, e.g., for use in electrical tapes and in the manufacture of insulators for electric motors, etc. Extrusion or shaping of the higher melting polyesters is generally facilitated by the use of plasticizers, especially by plasticizers such as 1,2-diphenoxyethane or p-toluenesulfonamide which may be removed from the shaped polyester article by leaching with water or other solvent, or by heating at a temperature sufficient to drive off the plasticizer. Polyesters having an intrinsic viscosity of at least about 0.2 are considered to be of sufficiently high molecular weight for utility in forming molded articles as well as films. For use in extruding fibers (including filaments), polycondensation is usually continued until the intrinsic viscosity is at least about 0.3.

The following examples will serve to illustrate the preparation of 1,4-bicyclo[2·2·2]octanedimethanol, as well as typical esters, polyesters and copolyesters derived therefrom. The esters indicated as intermediate esterification products are readily purified by crystallization from benzene, but may be converted directly to polyesters by continuing the reaction under polycondensation conditions. The examples are not intended to be limitative.

As used herein, the "polymer-melt temperature," abbreviated "PMT," is defined as that temperature where a polymer sample becomes molten and leaves a trail when moved across a hot metal surface with moderate pressure. Practical considerations in PMT determinations are discussed by Sorenson and Campbell in "Preparative Methods of Polymer Chemistry," Interscience Publishers, Inc., N.Y., pages 49–50 (1961).

The expression "second order transition temperature," designated herein by the symbol "$T_g$," is defined as the temperature at which a discontinuity occurs in the curve of a first derivative thermodynamic quantity when plotted as a function of the polymer temperature. It is correlated with yield temperature and polymer fluidity and can be observed from a plot of density, specific volume, specific heat, sonic modulus, or index or refraction against temperature. $T_g$ is sometimes also known as the "glass transition temperature" because it is the temperature below which the polymer exhibits glass-like behavior; above $T_g$ the polymer is somewhat more rubber-like. A convenient method for determining $T_g$ for a given sample of polymer is given by Pace in his U.S. Patent No. 2,556,295 (column 3, line 24 to column 4, line 19).

EXAMPLE 1

*Preparation of 1,4-bicyclo[2·2·2]octanedimethanol*

A solution of 45 g. (0.2 mol) of dimethyl 1,4-bicyclo[2·2·2]octanedicarboxylate in 500 cc. of tetrahydrofuran is added dropwise to a refluxing slurry of 19 g. of lithium aluminum hydride in 500 cc. of tetrahydrofuran. After the addition is complete, the mixture is refluxed for 18 hours. Excess lithium aluminum hydride is then destroyed by adding 100 cc. of ethyl acetate drop by drop. The mixture is cooled to −10° C., following which 65 cc. of concentrated sulfuric acid diluted with 150 cc. of ice water is added dropwise. After allowing the mixture to warm to room temperature, 100 cc. of water is added. The ether layer is decanted and the remaining aqueous mixture is again extracted with ether. The combined ether extracts are evaporated, after which the resulting glycol is purified by recrystallization from xylene. The product 1,4-bicyclo[2·2·2]octanedimethanol, has a melting point of 108° C.

The ester, 1,4-bicyclo[2·2·2]octanedimethylene dibenzoate, prepared by reacting the glycol with benzoyl chloride in pyridine, has a melting point of 118° C. The results obtained upon analysis of the dibenzoate for carbon and hydrogen are: C=76.19%, 76.14% (theoretical 76.2%); H=6.90%, 7.02% (theoretical 6.93%).

EXAMPLE 2

*Poly(1,4-bicyclo[2·2·2]octanedimethylene ethylene-4,4'-dibenzoate)*

To a small polymer tube is added 11.9 g. (0.07 mol) of 1,4-bicyclo[2·2·2]octanedimethanol, 10.4 g. (0.035 mol) of dimethyl ethylene-4,4'-dibenzoate and, as a catalyst, 8 drops of an 8% solution of sodium hydrogen hexabutoxytitanate, $NaHTi(OBu)_6$, in n-butanol. The ingredients are melted and a capillary for introducing nitrogen is inserted in the polymer tube. Ester exchange is carried out for 2 hours at 230° C. with evolution of methanol. The product is substantially pure bis(4-hydroxymethylbicyclo[2·2·2]octane - 1 - methylene) ethylene-4,4'-dibenzoate. The flow of inert gas is then changed from nitrogen to xylene, the temperature is raised to 285° C., and vacuum is applied gradually until the pressure is reduced to 0.05 mm. of mercury. After 2.5 hours of poly-condensation at this temperature and pressure with a continuous slow stream of xylene maintained through the tube, the mixture is cooled and a white solid having an intrinsic viscosity of 0.44 is produced. The product has a polymer-melt temperature, PMT, of 170° C. This polyester, poly(1,4-bicyclo[2·2·2]octanedimethylene ethylene-4,4'-dibenzoate), is crystallized by soaking it in benzene, after which it is crushed to a fine powder and then heated under a stream of xylene vapor at a pressure of 0.5 mm. of mercury at 200° C. for 1 hour, 220° C. for 1 hour, and 230° C. for 3 hours. At the conclusion of this solid phase polymerization reaction, the PMT is 245° C. and the intrinsic viscosity of the product is 0.72.

EXAMPLE 3

*Fibers of poly(1,4-bicyclo[2·2·2]octanedimethylene ethylene-4,4'-dibenzoate)*

A molten sample of the solid phase polymerized product of Example 2 is extruded to form a filament, using conventional techniques. The filament has a $T_g$ of 73° C. It is oriented by drawing it 2.5× at 165° C. over a hot plate. The resulting fiber has a tenacity of 1.5 g.p.d., a break elongation of 20%, and a modulus of 50 g.p.d. The drawn filament is heat treated by boiling it in water for 3 minutes, heating it in an oven at 140° C. for 10 minutes and then at 160° C. for 5 minutes, and finally immersing it in boiling water again for 3 minutes. The heat-treated filament has a tenacity of 0.6 g.p.d., an elongation of 4%, and an initial modulus of 21 g.p.d. The filament is found to have an excellent ability to recover from low levels of extension. Values for "tensile strain recovery" (TSR) and "moduli relaxation index" (MRI) are 76% and 0.04, respectively. The filament is oriented and crystalline as shown by its X-ray diffraction pattern.

The TSR of a filament is determined by mounting a 10-inch length of the filament on a tensile tester with recording chart (commercially available from the Instron Engineering Corporation, Quincy, Mass.) and also equipped with a circulating water bath which can be raised and lowered. The water bath, maintained at 40° C., is raised to immerse the filament. After the filament has been immersed for 2 minutes without tension it is stretched, in the water bath, at an elongation rate of 1-inch per minute. Upon reaching the desired total elongation, the sample is held at constant length for an additional 2 minutes and the water bath is removed. The load on the filament is then reduced to a value of 0.042 g.p.d. and the filament is allowed to retract. Percent recovery is calculated from the formula:

$$\frac{\text{units of retraction}}{\text{units of elongation}} \times 100\%$$

This procedure is carried out for elongations of 0.5, 1, 2, and 3%, and a graph is prepared by plotting the percent recovery against total elongation in the range 0–3%. TSR values are average percent recovery values from the range 0–3% elongation which may be determined from the graph by usual graphical averaging procedures. Filaments having TSR values of 60% are considered to have good tensile recovery.

The MRI of a filament is determined by mounting a 10-inch length of the filament on a tensile tester of the above type, except that the tester is additionally equipped with a tube heater surrounding the filament. The filament is first heated for 4 minutes at 70° C. with the tube heater, after which it is stretched while hot to an extension of 1%±0.04%. Upon reaching 1% elongation, the sample is held at constant length for about 1 minute, still at 70° C., during which time the force required to maintain the filament at this extension is recorded on the chart. The cross head of the tensile tester is then returned to its original position, leaving the filament with a small amount of slack. The circulating water bath, maintained at 70° C., is raised so that the filament is submerged. After the sample has been heated in water for 4 minutes at this temperature, the slack is taken up and the sample is stretched again to 1%±0.05% elongation. The cross head is then finally returned again to its original position. Data are then taken from the chart of the tensile tester to calculate the dry and wet moduli and the loss factor, as follows:

$$G_{(dry)} = \frac{F_a}{\text{denier}} \times \frac{100}{\% \text{ extension}}$$

$$G_{(wet)} = \frac{F'_a}{\text{denier}} \times \frac{100}{\% \text{ extension}}$$

$$L = \frac{F_a - F_b}{F_a}$$

$$MRI = \frac{G_{(dry)}}{G_{(wet)}} \times L$$

where $G_{(dry)}$ is the dry modulus and $G_{(wet)}$ is the wet modulus, $F_a$ is the initial force required to achieve 1% elongation in the dry filament and $F_a'$ is the initial force required to achieve 1% elongation in the wet filament, $F_b$ is the force required to maintain the dry filament at constant 1% elongation 45 seconds after 1% elongation is initially achieved, and L is the loss factor. Low values of MRI are indicative of a high predicted fabric recovery, especially values below 0.2. Comparative MRI values for commercial 6—6 nylon and polyethylene terephthalate fibers are 0.9 and 0.2, respectively.

EXAMPLE 4

*Poly(1,4-bicyclo[2·2·2]octanedimethylene terephthalate)*

Following the general procedure of Example 2, 14 g. (0.082 mol) of 1,4-bicyclo[2·2·2]octanedimethanol and 7.26 g. (0.037 mol) of dimethyl terephthalate are reacted in the presence of 10 drops of an 8% solution of NaHTi(OBu)₆ in n-butanol. Ester exchange is carried out under nitrogen for 2.5 hours at 230° C. with evolution of methanol, resulting in the formation of bis(4-hydroxymethylbicyclo[2·2·2]octane-1-methylene) terephthalate. Polycondensation is then carried out under an atmosphere of xylene at 295° C. and 0.1 mm. of mercury for 1.5 hours. The resulting polyester has an intrinsic viscosity of 0.2. Subsequently, solid phase polymerization is carried out under a stream of nitrogen at a pressure of 0.5 mm. of mercury at 240° C. for 4 hours, yielding a polymer having a PMT of 305° C. identified as poly(1,4-bicyclo [2·2·2]octanedimethylene terephthalate). The polymer is insoluble in trifluoroacetic acid/methylene chloride mixture. A clear, tough, drawable film is readily melt-pressed from the polymer.

EXAMPLE 5

*Poly(1,4-bicyclo[2·2·2]octanedimethylene isophthalate)*

Into a small polymer tube is placed 14 g. (0.082 mol) of 1,4-bicyclo[2·2·2]octanedimethanol, 7.26 g. (0.037 mol) of dimethyl isophthalate, and 8 drops of 8% NaHTi(OBu)₆ in n-butanol. These are reacted for 2 hours at 230° C. while flowing nitrogen into the tube. The resulting ester exchange product is bis(4-hydroxymethylbicyclo[2·2·2]octane - 1 - methylene)isophthalate. Melt polymerization of this ester is then carried out in the manner of Example 2. The PMT of the resulting polyester is 170° C., and the intrinsic viscosity is 0.3. Orientable fibers are prepared from melt as in Example 3.

EXAMPLE 6

*Copolyester fibers and films of improved dyeability with basic dyes*

The procedure described in Example 4 for preparation of poly(1,4-bicyclo[2·2·2]octanedimethylene terephthalate) is repeated, substituting in place of the dimethyl terephthalate a mixture of 0.0359 mol of dimethyl terephthalate and 0.0011 mol of sodium 3,5-di(carbomethoxy)benzenesulfonate. The product, poly(1,4-bicyclo [2·2·2]octanedimethylene terephthalate/5-[sodium sulfo]-isophthalate), 97/3 mol percent, yields a clear, tough, drawable film which exhibits greatly enhanced dyeability with Fuchine SBP dye (C.I. 42, 510) and other basic dyes as contrasted with the corresponding homopolyester film of Example 4, which has virtually no affinity for these basic dyes. Orientable fibers dyeable with basic dyes are spun from the copolyester melt as in Example 3.

EXAMPLE 7

*Copolyester fibers and films of improved dyeability with disperse dyes*

The procedure described in Example 4 for preparation of poly(1,4-bicyclo[2·2·2]octanedimethylene terephthalate) is repeated, substituting in the place of the dimethyl terephthalate a mixture of 0.0336 mol of dimethyl terephthalate and 0.0034 mol of dimethyl sebacate. The product, poly(1,4-bicyclo[2·2·2]octanedimethylene terephthalate/sebacate), 90/10 mol percent, yields a clear, tough, drawable film which exhibits enhanced dyeability with 1,4-diamino-2,3-dichloroanthraquinone (a violet disperse dye) and other disperse dyes as contrasted with the corresponding homopolyester film of Example 4. Orientable fibers dyeable with disperse dyes are spun from the copolyester as in Example 3.

EXAMPLE 8

*Poly(1,4-bicyclo[2·2·2]octanedimethylene 1,3-adamantanedicarboxylate)*

Following the general procedure of Example 2, 11.3 g. (0.066 mol) of 1,4-bicyclo[2·2·2]octanedimethanol and 8.4 g. (0.033 mol) of dimethyl 1,3-adamantanedicarboxylate are reacted in the presence of 5 drops of an 8% solution of NaHTi(OBu)₆ in n-butanol. Ester exchange is carried out under nitrogen for 2 hours at 220–230° C. with evolution of methanol resulting in the formation of substantially pure bis(4-hydroxymethylbicyclo[2·2·2]- octane-1-methylene) 1,3-adamantanedicarboxylate. Polycondensation is then carried out under an atmosphere of xylene at 250–280° C. and 0.1 mm. of mercury for 4.5 hours. Although the product initially appears to be amorphous, upon treatment with methylene chloride it crystallizes and exhibits a PMT of 240° C. Subsequently, solid phase polymerization is carried out under a stream of nitrogen at a pressure of 0.5 mm. of mercury for 6 hours with the temperature slowly being raised from 220 to 250° C. The PMT of the resulting polyester, which is crystalline as shown by its X-ray diffraction pattern, is 250° C. and it is determined that its intrinsic viscosity is 0.37. The polyester is identified as poly(1,4-bicyclo- [2·2·2]octanedimethylene 1,3 - adamantanedicarboxylate).

EXAMPLE 9

*Poly(1,4-bicyclo[2·2·2]octanedimethylene 1,4-butylene-bis[4-oxybenzoate])*

Following the general procedure of Example 2, 12.78 g. (0.075 mol) of 1,4-bicyclo[2·2·2]octanedimethanol and 12.25 g. (0.034 mol) of dimethyl 1,4-butylene-bis-(4-oxybenzoate) are reacted in the presence of 8 drops of an 8% solution of NaHTi(OBu)₆ in n-butanol. Ester exchange is carried out under nitrogen for 2.5 hours at 225° C. with evolution of methanol, resulting in the formation of bis(4-hydroxymethylbicyclo[2·2·2]octane- 1-methylene) 1,4-butylene-bis(4-oxybenzoate). Melt polycondensation is then performed under an atmosphere of xylene at 285° C. and 0.05 mm. of mercury for 2.5 hours. The PMT of the resulting polyester is 145° C. and the Following ester exchange and polycondensation in accordance with the general procedure of Example 2, the indicated linear polyesters are obtained, from the melts of which orientable fibers can be pulled.

TABLE.—POLYESTERS PREPARED FROM 1,4-BICYCLO[2·2·2]OCTANEDIMETHANOL (0.07 MOL) AND VARIOUS DIMETHYL ESTERS (0.035 MOL)

| Dimethyl Ester | Weight in grams of Dimethyl Ester Used | Polyester |
| --- | --- | --- |
| Dimethyl sulfonyl-4,4'-dibenzoate | 11.7 | Poly(1,4-bicyclo[2·2·2]octanedimethylene sulfonyl-4,4'-dibenzoate). |
| Dimethyl 2,6-naphthalenedicarboxylate | 8.6 | Poly(1,4-bicyclo[2·2·2]octanedimethylene 2,6-naphthalenedicarboxylate). |
| Dimethyl chloroterephthalate | 8.0 | Poly(1,4-bicyclo[2·2·2]octanedimethylene chloroterephthalate). |
| Dimethyl carbonyl-4,4'-dibenzoate | 10.5 | Poly(1,4-bicyclo[2·2·2]octanedimethylene carbonyl-4,4'-dibenzoate). |
| Dimethyl 2,8-dibenzofurandicarboxylate | 10.0 | Poly(1,4-bicyclo[2·2·2]octanedimethylene 2,8-dibenzofurandicarboxylate). |
| Dimethyl oxalate | 4.1 | Poly(1,4-bicyclo[2·2·2]octanedimethylene oxalate). |
| Dimethyl sebacate | 8.1 | Poly(1,4-bicyclo[2·2·2]octanedimethylene sebacate). | intrinsic viscosity is 0.43. The product, poly(1,4-bicyclo[2·2·2]octanedimethylene 1,4-butylene-bis[4 - oxybenzoate]), is spun into orientable fibers as in Example 3. When drawn 2× around curved hot plates maintained at 112° C., the fibers exhibit a TSR of 67% and an MRI of 0.02.

EXAMPLE 10

*Poly(1,4-bicyclo[2·2·2]octanedimethylene 1,4-bicyclo[2·2·2]octanedicarboxylate)*

Following the general procedure of Example 2, 14 g. (0.082 mol) of 1,4-bicyclo[2·2·2]octanedimethanol and 8.46 g. (0.037 mol) of dimethyl 1,4-bicyclo[2·2·2]octanedicarboxylate are reacted in the presence of 10 drops of an 8% solution of NaHTi(OBu)$_6$ in n-butanol. Ester exchange is carried out under nitrogen for 2.5 hours at 220–230° C. with evolution of methanol, resulting in the formation of bis(4-hydroxymethylbicyclo[2·2·2]octane-1 - methylene) 1,4 - bicyclo [2·2·2] octanedicarboxylate. Polycondensation is then carried out under an atmosphere of xylene at 285° C. and 0.07 mm. of mercury for 2.5 hours. The product has a PMT of 293° C. and an intrinsic viscosity of 0.17. Subsequently, solid phase polymerization is carried out under a stream of nitrogen at a pressure of 0.5 mm. of mercury for 4 hours at 240° C. The PMT of the resulting polymer is 315° C. The polyester is identified as poly(1,4-bicyclo[2·2·2]octanedimethylene 1,4-bicyclo[2·2·2]octanedicarboxylate).

EXAMPLE 11

*Poly(1,4-bicyclo[2·2·2]octanedimethylene carbonate)*

Following the general procedure of Example 2, 7.2 g. (0.0422 mol) of 1,4-bicyclo[2·2·2]octanedimethanol and 8.5 g. (0.04 mol) of diphenyl carbonate are reacted in the presence of three drops of an 8% solution of NaHTi(OBu)$_6$ in n-butanol. Ester exchange is carried out under nitrogen for 2 hours at 220–230° C. with evolution of methanol, after which polycondensation is carried out under an atmosphere of xylene at 275–290° C. and 0.07 mm. of mercury for 4 hours. The product is a white polymeric solid having a PMT of 290–295° C., identified as poly(1,4-bicyclo[2·2·2]octanedimethylene carbonate).

EXAMPLE 12

The linear condensation polyesters listed in the table are prepared by reacting 11.9 g. (0.07 mol) of 1,4-bicyclo[2·2·2]octanedimethanol with each of the dimethyl esters listed in the table in the amounts indicated (0.035 mol each), employing in each instance a catalyst comprising 8 drops of an 8% solution of NaHTi(OBu)$_6$ in n-butanol.

Since many different embodiments of the invention may be made without departing from the spirit and scope thereof, it is to be understood that the invention is not limited by the specific illustrations except to the extent defined in the following claims.

We claim:
1. A linear polyester, having an intrinsic viscosity of at least 0.2, consisting essentially of recurrnig units represented by the structural formula

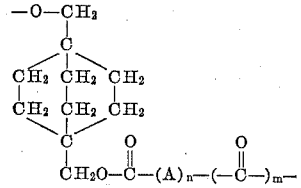

wherein $m$ is 0 or 1, $n$ is 0 when $m$ is 0, $n$ is 0 or 1 when $m$ is 1, and A is a divalent radical which is primarily hydrocarbon, of 6 to 24 carbon atoms including at least one 6-membered carbocyclic nucleus, the carboxyl substituents being separated by a chain of at least three nuclear carbon atoms, with the proviso that radical A is free from aliphatic unsaturation and may contain halogen or chalkogen, wherein each chalkogen atom is bonded to carbon or a different chalkogen atom, as the only non-hydrocarbon components.

2. A linear polyester, having an intrinsic viscosity of at least 0.2, composed of at least 90 percent of recurring units as defined in claim 1.

3. Fibers of the linear polyester defined in claim 1.

4. Films of the linear polyester defined in claim 1.

5. Poly(1,4 - bicyclo[2·2·2]octanedimethylene ethylene-4,4'-dibenzoate) having an intrinsic viscosity of at least 0.2.

6. Poly(1,4 - bicyclo[2·2·2]octanedimethylene terephthalate) having an intrinsic viscosity of at least 0.2.

7. Poly(1,4 - bicyclo[2·2·2]octanedimethylene isophthalate) having an intrinsic viscosity of at least 0.2.

8. Poly(1,4 - bicyclo[2·2·2]octanedimethylene terephthalate/sebacate) having an intrinsic viscosity of at least 0.2.

9. Poly(1,4-bicyclo[2·2·2]octanedimethylene 1,3-adamantanedicarboxylate) having an intrinsic viscosity of at least 0.2.

10. Poly(1,4-bicyclo[2·2·2]octanedimethylene 1,4-butylene-bis[4-oxybenzoate]) having an intrinsic viscosity of at least 0.2.

11. Poly(1,4-bicyclo[2·2·2]octanedimethylene 1,4-bicyclo[2·2·2]octanedicarboxylate) having an intrinsic viscosity of at least 0.2.

12. Poly(1,4 - bicyclo[2·2·2]octanedimethylene carbonate) having an intrinsic viscosity of at least 0.2.

References Cited

UNITED STATES PATENTS

| | | | |
|---|---|---|---|
| 2,720,502 | 10/1955 | Caldwell | 260—75 |
| 2,850,523 | 9/1958 | Dazzi | 260—468 |
| 2,936,324 | 5/1960 | Hasek et al. | 260—617 |
| 3,014,048 | 12/1961 | Tinsley et al. | 260—75 |
| 3,047,539 | 7/1962 | Pengilly | 260—75 |
| 3,255,254 | 6/1966 | Kauer | 260—75 |
| 3,256,241 | 6/1966 | Watson | 260—47 |

WILLIAM H. SHORT, *Primary Examiner.*

LOUISE P. QUAST, *Examiner.*